Figures 1, 2:
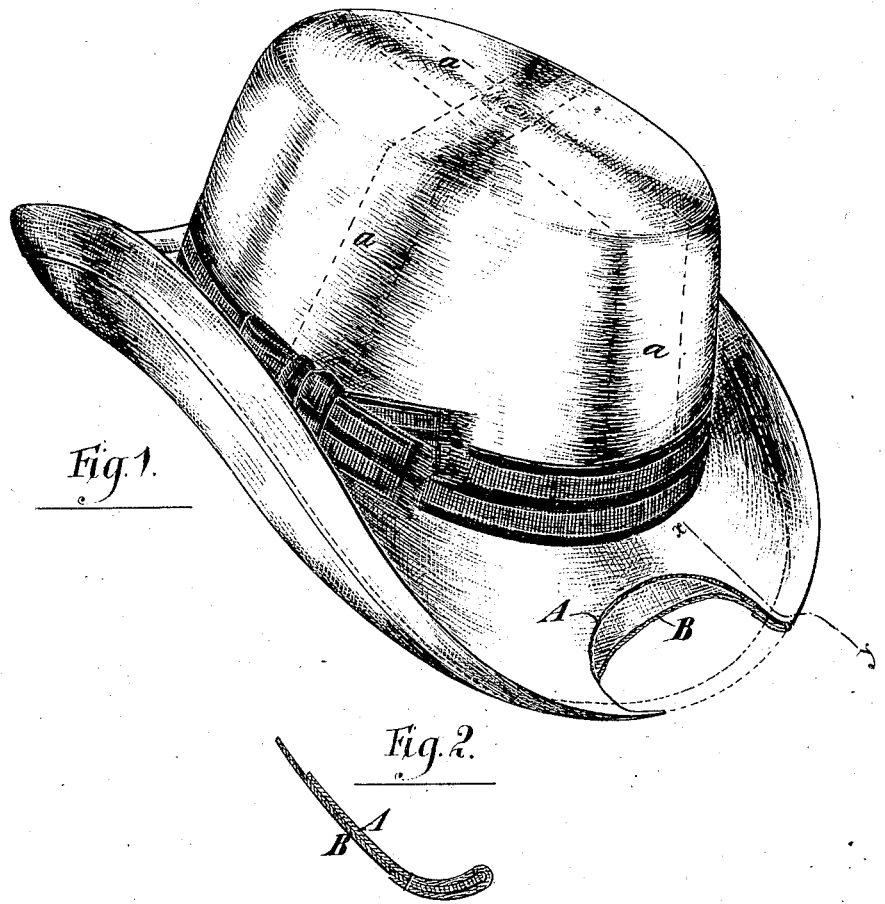

(No Model.)

E. COPLESTON.
HAT.

No. 283,863. Patented Aug. 28, 1883.

Witnesses:
James R. Bowen.
Chandler Hall

Inventor:
Edwin Copleston
by his attorney,
Edwin H. Brown

UNITED STATES PATENT OFFICE.

EDWIN COPLESTON, OF NYACK, NEW YORK.

HAT.

SPECIFICATION forming part of Letters Patent No. 283,863, dated August 28, 1883.

Application filed July 11, 1883. (No model.)

*To all whom it may concern:*

Be it known that I, EDWIN COPLESTON, of Nyack, in the county of Rockland and State of New York, have invented a certain new and useful Improvement in Hats made of Manila or Java Straw and like Materials, of which the following is a specification.

My improvement consists in the combination, in a hat made of Manila or Java straw or like material, of two sections, one fitted within the other, and an elastic cement or adhesive substance uniting the two sections. The improvement also involves a particular process of making such a hat as that above described.

In the accompanying drawings, Figure 1 is a perspective view of a hat made according to my improvement, and having a certain portion of the outer section broken away, so that the inner section may be seen; and Fig. 2 is a view of a portion of the brim of the same on a larger scale.

Similar letters of reference designate corresponding parts in both figures.

A designates the outer section of the hat, and B designates the inner section of the hat. These sections are formed separately. They are made of Manila straw, Java straw, or other like material. The inner section, B, may be made of coarser material than the outer, if desirable, for the sake of economy, or for the purpose of making a stiff hat with a fine exterior. The two sections are secured together by any suitable elastic cement or adhesive substance. Preferably cement or adhesive substance which is water-proof as well as elastic will be used, so that it will not be affected by wetting the hat.

The sections of which the hat is made are blocked after they are manufactured for the purpose of imparting to them the desired shape. They may be blocked separately and then united by the cement or adhesive substance; or they may be first united by the cement or adhesive substance and then blocked together.

The cement may be applied over the entire meeting surfaces of the sections; or it may be applied only at intervals or in stripes at the crown, as indicated by the stripes *a*, drawn in dotted outlines in Fig. 1, and over the entire meeting surfaces of the brim.

When the sections have the cement or adhesive substance applied and are fitted together, they are carefully adjusted, so as to fit smoothly together all over without puckering.

It is advantageous to unite the sections of the hat before blocking, for the steam employed in blocking will soften the cement or adhesive substance, so that it will set with the sections properly shaped and in their proper relative positions, and will drive off any volatile solvents that may have been used in the cement or adhesive substance. The outer of the sections is run over with a hot iron during the blocking process.

The cement or adhesive substance which I prefer to use consists of india-rubber dissolved in benzine or naphtha, with or without a portion of gum-dammar. This may be applied with a brush. I may use any other suitable cement or adhesive substance.

A hat thus made of two sections united by an elastic cement or adhesive substance will keep its shape very much better than an ordinary hat, because each section forms, as it were, a brace for the other, and also because the strands of the sections are tied or fastened, so as to brace one another.

If a water-proof cement or adhesive substance is employed to unite the sections, even a wetting of the hat will not be apt to impair its shape.

Notwithstanding the fact that a hat made according to my improvement will hold its shape, it is of a soft texture, for the reason that the cement or adhesive substance is elastic.

A hat made according to my improvement will be more durable than an ordinary hat made of the same material, for it will be more difficult to break or fracture the component parts of either section where it is secured to the other section by the cement or adhesive substance. If a break or fracture is made in one of the sections, it will scarcely be discernible, because the broken parts will be held down close together.

What I claim as my invention, and desire to secure by Letters Patent, is—

1. The process of making a hat of Manila or Java straw or like materials, consisting in making two independent sections, uniting them with an elastic cement or adhesive substance, and blocking them either before or after they are united, substantially as specified.

2. As a new article of manufacture, a hat consisting of two sections formed separately and united by an elastic cement or adhesive substance, substantially as specified.

EDWIN COPLESTON.

Witnesses:
 T. J. KEANE,
 JAMES R. BOWEN.